(12) United States Patent
Rechberger et al.

(10) Patent No.: US 10,374,242 B2
(45) Date of Patent: Aug. 6, 2019

(54) ENERGY GENERATING UNIT COMPRISING A HIGH-TEMPERATURE FUEL CELL STACK AND A VAPORIZING UNIT

(71) Applicant: AVL LIST GMBH, Graz (AT)

(72) Inventors: Juergen Rechberger, Graz (AT); Michael Reissig, Graz (AT)

(73) Assignee: AVL LIST GMBH, Graz (AT)

( * ) Notice: Subject to any disclaimer, the term of this patent is extended or adjusted under 35 U.S.C. 154(b) by 234 days.

(21) Appl. No.: 14/765,616

(22) PCT Filed: Feb. 4, 2014

(86) PCT No.: PCT/EP2014/000285
§ 371 (c)(1),
(2) Date: Aug. 4, 2015

(87) PCT Pub. No.: WO2014/117949
PCT Pub. Date: Aug. 7, 2014

(65) Prior Publication Data
US 2016/0006062 A1  Jan. 7, 2016

(30) Foreign Application Priority Data
Feb. 4, 2013  (AT) .................................. A 84/2013

(51) Int. Cl.
*H01M 8/06* (2016.01)
*H01M 8/0612* (2016.01)
(Continued)

(52) U.S. Cl.
CPC ............. *H01M 8/0618* (2013.01); *C01B 3/32* (2013.01); *F22B 1/1853* (2013.01); *F22B 37/60* (2013.01);
(Continued)

(58) Field of Classification Search
None
See application file for complete search history.

(56) References Cited

U.S. PATENT DOCUMENTS 7,461,618 B2   12/2008  Pors et al.
2002/0114988 A1  8/2002  Iwasaki et al.
(Continued)

FOREIGN PATENT DOCUMENTS

AT    502131     1/2007
CA   2587326     5/2006
(Continued)

OTHER PUBLICATIONS

International Search Report prepared by the European Patent Office dated Apr. 23, 2014, for International Application No. PCT/EP2014/000285.
(Continued)

*Primary Examiner* — Jeremiah R Smith
(74) *Attorney, Agent, or Firm* — Sheridan Ross P.C.

(57) ABSTRACT

The invention relates to an energy generation unit comprising a high-temperature fuel cell stack (10), which is operated with liquid fuel, and a reformer (11) connected upstream of the fuel cell stack for processing the fuel, a recirculation line (13) for at least partially feeding back the anode exhaust gas into the reformer (1) and a device for feeding the liquid fuel into the anode exhaust gas. In accordance with the invention, the invention for feeding the fuel is in the form of an evaporator device (20), comprising a housing (21) which has an evaporator nonwoven (23) in the region of the fuel feed line (22), wherein the hot anode exhaust gas can be applied to said evaporator nonwoven from the recirculation line (13).

11 Claims, 3 Drawing Sheets

Figure 1:
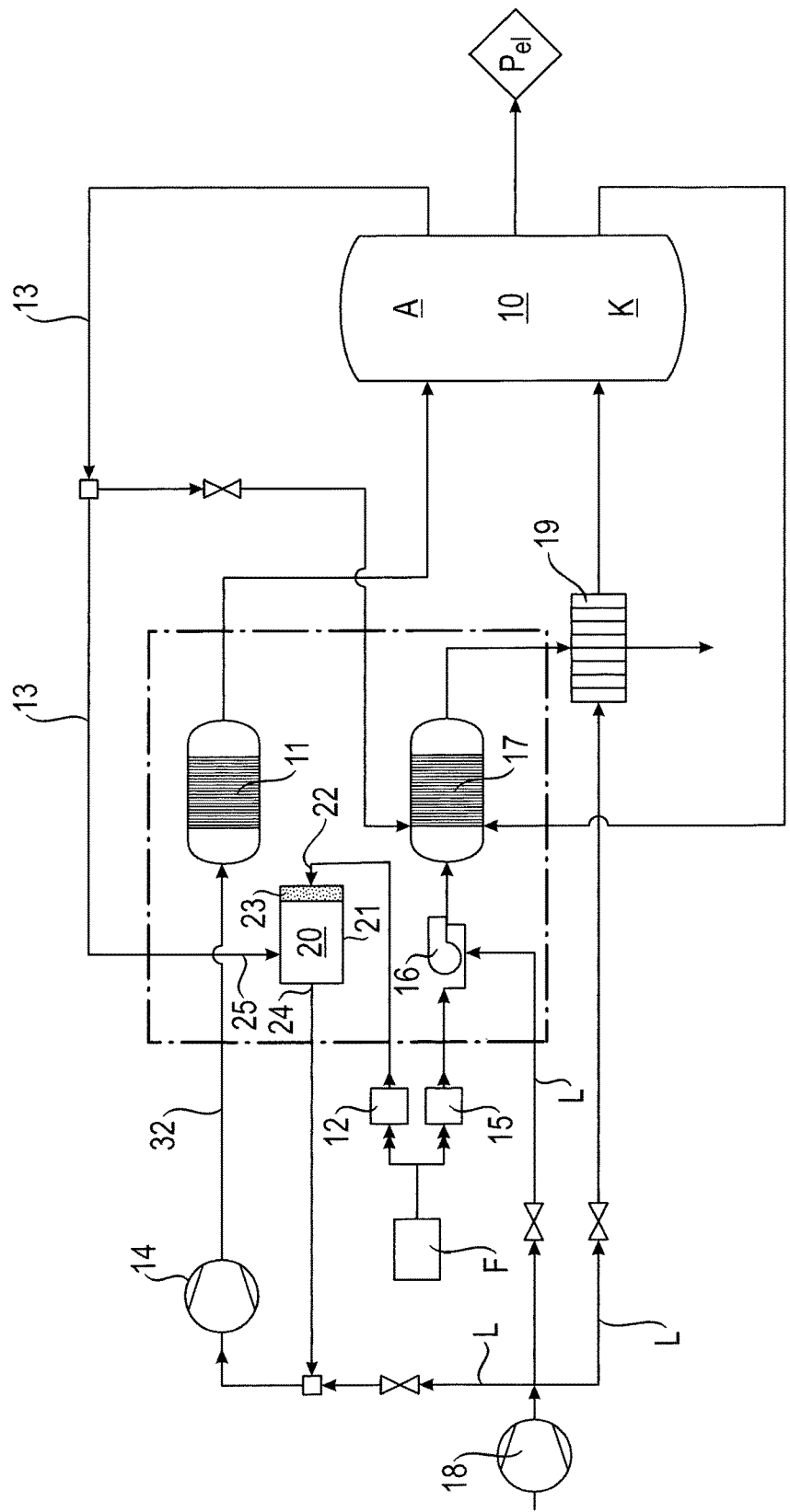

(51) Int. Cl.
*C01B 3/32* (2006.01)
*F22B 1/18* (2006.01)
*F22B 37/60* (2006.01)
*H01M 8/124* (2016.01)

(52) U.S. Cl.
CPC ... *H01M 8/0625* (2013.01); *C01B 2203/0227* (2013.01); *C01B 2203/066* (2013.01); *C01B 2203/1276* (2013.01); *C01B 2203/1288* (2013.01); *H01M 8/06* (2013.01); *H01M 2008/1293* (2013.01); *H01M 2220/20* (2013.01)

(56) References Cited

U.S. PATENT DOCUMENTS

| | | | |
|---|---|---|---|
| 2003/0234455 A1* | 12/2003 | Mieney | B01B 1/005 261/76 |
| 2003/0235731 A1 | 12/2003 | Haltiner, Jr. et al. | |
| 2005/0095544 A1 | 5/2005 | Kaupert et al. | |
| 2005/0188616 A1 | 9/2005 | Bizjak et al. | |
| 2005/0214614 A1 | 9/2005 | Han | |
| 2008/0044695 A1 | 2/2008 | Kaupert | |
| 2008/0107937 A1* | 5/2008 | Ravenda | B01J 8/0221 429/425 |
| 2009/0258262 A1* | 10/2009 | Kaupert | H01M 8/04014 429/425 |
| 2011/0269032 A1 | 11/2011 | Fischer et al. | |
| 2011/0269037 A1* | 11/2011 | Burmeister | B01F 3/02 429/415 |
| 2013/0029237 A1 | 1/2013 | Fujisawa et al. | |
| 2013/0153010 A1* | 6/2013 | Li | F23D 3/40 136/253 |

FOREIGN PATENT DOCUMENTS

| | | |
|---|---|---|
| DE | 4446841 | 7/1996 |
| DE | 10243275 A1 | 4/2004 |
| DE | 102007039594 | 4/2008 |
| DE | 102007018311 A1 | 10/2008 |
| DE | 102011107669 A1 | 1/2013 |
| EP | 1414092 | 4/2004 |
| EP | 2256850 | 12/2010 |
| JP | 2007-220548 | 8/2007 |
| JP | 2008-520529 | 6/2008 |
| WO | WO 99/44252 | 9/1999 |
| WO | WO 2007/136080 | 11/2007 |

OTHER PUBLICATIONS

Office Action prepared by the Austrian Patent Office dated Jan. 8, 2014, for Austria Patent Application No. A84/2013.
U.S. Appl. No. 14/765,605, filed Aug. 4, 2015, Reissig.
Written Opinion for International (PCT) Patent Application No. PCT/EP2014/000285, dated Apr. 30, 2014 with English translation, 12 pages.
International Preliminary Report on Patentability for International (PCT) Patent Application No. PCT/EP2014/000285, dated Aug. 4, 2015 with English translation, 14 pages.
International Search Report for International (PCT) Patent Application No. PCT/EP2014/000290, dated Apr. 30, 2014 with English translation, 7 pages.
Written Opinion for International (PCT) Patent Application No. PCT/EP2014/000290, dated Apr. 30, 2014 with English translation, 12 pages.
International Preliminary Report on Patentability for International (PCT) Patent Application No. PCT/EP2014/000290, dated Aug. 4, 2015 with English translation, 14 pages.
Official Action for Austrian Patent Application No. A84/2013, dated Jan. 8, 2014, 3 pages.
Official Action with Machine Translation for Japan Patent Application No. 2015-555614, dated Dec. 4, 2017, 9 pages.
Official Action (untranslated) for Japanese Patent Aplication No. 2015-555615, dated Nov. 28, 2017, 4 pages.

* cited by examiner

ENERGY GENERATING UNIT COMPRISING A HIGH-TEMPERATURE FUEL CELL STACK AND A VAPORIZING UNIT

CROSS REFERENCE TO RELATED APPLICATIONS

This application is a national stage application under 35 U.S.C. 371 and claims the benefit of PCT Application No. PCT/EP2014/000285 having an international filing date of Feb. 4, 2014, which designated the United States, which PCT application claims the benefit of Austria Application No. A 84/2013 filed Feb. 4, 2013, the disclosures of each are incorporated by reference herein.

The invention relates to an energy generating unit comprising a high-temperature fuel cell stack operated by liquid fuel and a reformer connected upstream of the fuel cell stack for processing the fuel, a recirculation line for at least partially recirculating the anode exhaust gas into the reformer as well as a device for feeding the liquid fuel into the anode exhaust gas. The invention further relates to a vaporizing unit for producing an educt gas from a hot carrier gas, for example anode exhaust gas, and a liquid fuel for operating a high-temperature fuel cell stack having an upstream reformer.

Such an energy generating unit (Auxiliary Power Unit APU) can be used for example in motor vehicles where it serves to supply electrical and thermal energy.

An energy generating unit having at least one high-temperature fuel cell is known for example from AT 502 131 B1, in which a recirculation line is provided for the anode exhaust gas which leads from an outlet line for the anode exhaust gas to a feeder line of a reformer for treating the fuel. An injector for spraying or injecting liquid fuel into the hot anode exhaust gas leads into the recirculation line upstream of a compressor which is upstream of the reformer. The nozzles or injectors used for injecting fuel have the disadvantage of not being suitable for use in hot environments and thus hindering a compact design. Also disadvantageous is the poor nozzle and injector spray pattern when operating under partial load, which leads to poor vaporization or homogenization respectively of the fuel.

US 2002/0114988 A1 discloses a fuel cell system comprising a high-temperature fuel cell (SOFC) operated by a liquid hydrocarbon fuel cell, for example gasoline. The anode end has an upstream reformer for the liquid fuel. A portion of the hot anode exhaust gas is recirculated into the anode flow by means of anode recirculation, whereby the liquid fuel is sprayed or injected upstream of an anode blower which is upstream of the reformer. An atomizer is provided hereto, with which liquid fuel is introduced via an injector. The same disadvantages noted with respect to AT 502 131 B1 apply to this apparatus as well.

The task of the invention is that of further developing an energy generating unit of the type cited at the outset so as to yield a compact unit, particularly for use in an APU, whereby improvements are to be realized in terms of precise dosing of the liquid fuel and the homogenizing of the educt gas, also during partial load operation.

This task is solved in accordance with the invention by the device for feeding the fuel being realized as a vaporizing unit having a housing which comprises an evaporator nonwoven in the area of the fuel feed line upon which the hot anode exhaust gas from the recirculation line can act. By means of the vaporizing unit, the liquid diesel fuel or another hydrocarbon is injected into a hot carrier gas, preferentially the recirculated anode exhaust gas, and completely vaporized. This produces a fuel/gas mixture able to be supplied as educt gas to a reformer, for example an SOFC system.

According to the invention, the housing of the vaporizing unit is substantially cylindrical and comprises a central feed line for the fuel on one end and a central gas outlet for the educt gas on the opposite end. The housing of the vaporizing unit further comprises a gas inlet for the anode exhaust gas preferentially leading tangentially thereinto. The tangential confluence effects a vortex flow in the housing of the vaporizing unit which sweeps across the evaporator nonwoven and produces a homogeneous gas mixture, even when operating under partial load.

In order to quickly reach an optimum operating temperature, the housing of the vaporizing unit can preferentially be arranged in an exhaust gas chamber of the energy generating unit into which hot exhaust gas of the fuel cell stack and/or the starter burner of the energy generating unit is introduced.

A vaporizing unit for producing an educt gas from a hot carrier gas, for example anode exhaust gas, and a liquid fuel for operating a high-temperature fuel cell stack having an upstream reformer is thus inventively characterized by the vaporizing unit comprising a substantially cylindrical housing which has a central feed line for the fuel and an evaporator nonwoven on one end and a central gas outlet for the educt gas on the opposite end, wherein a gas inlet for the hot carrier gas preferentially leading tangentially thereinto is provided.

The ideal flow characteristics between the tangential gas inlet and the central gas outlet result in only low pressure losses during the operation of the vaporizing unit, whereby good evaporation rates can be achieved even given small volumes.

According to one variant of an inventive embodiment, the gas distributor housing (reformer manifold) arranged at the inlet of the reformer catalyst comprises an annular space into which the feed line for the fuel/gas mixture to be produced leads, whereby radial access openings are arranged outgoing from the annular space to the inlet area of the reformer catalyst. This measure results in homogenizing the gas flow through the catalyst.

According to one variant of an inventive embodiment, the vaporizing unit can comprise a dedicated heating element for the evaporator nonwoven, preferably an electrically heated glow plug.

Figure 2:
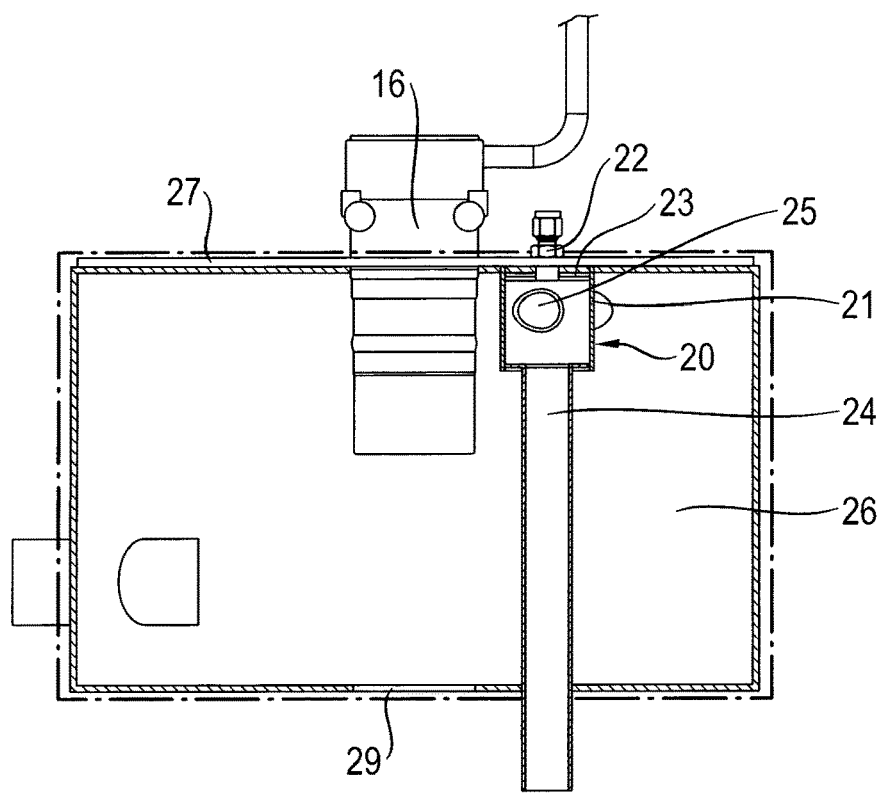
Figure 3:
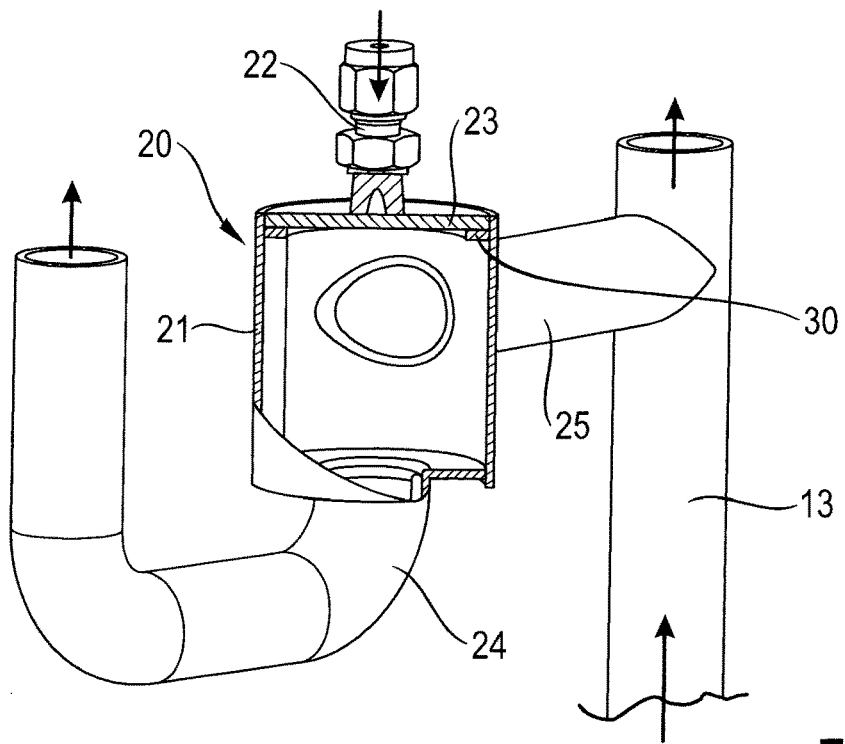
Figure 4:
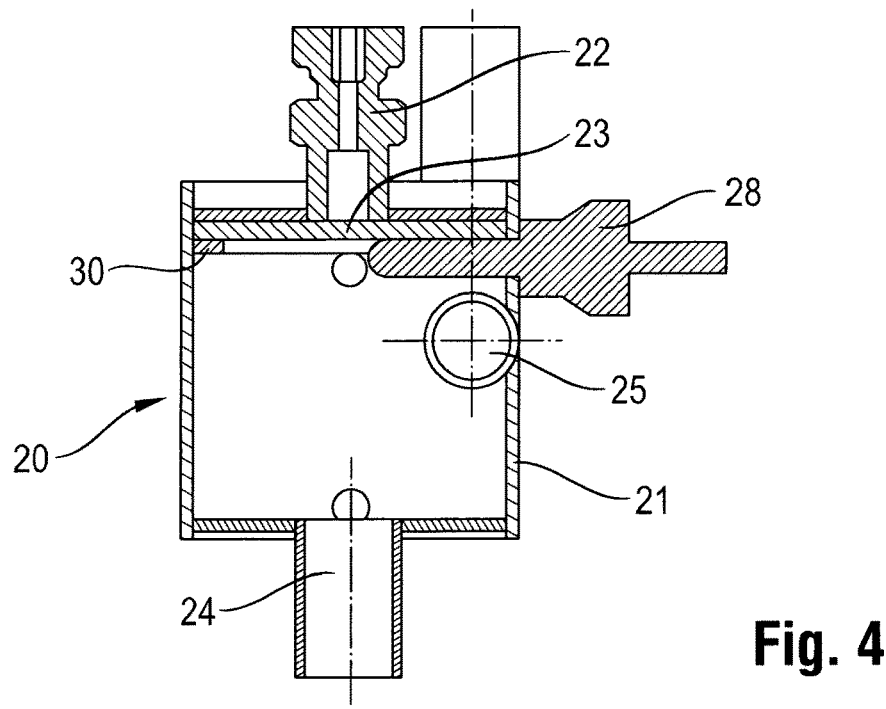
Figure 5:
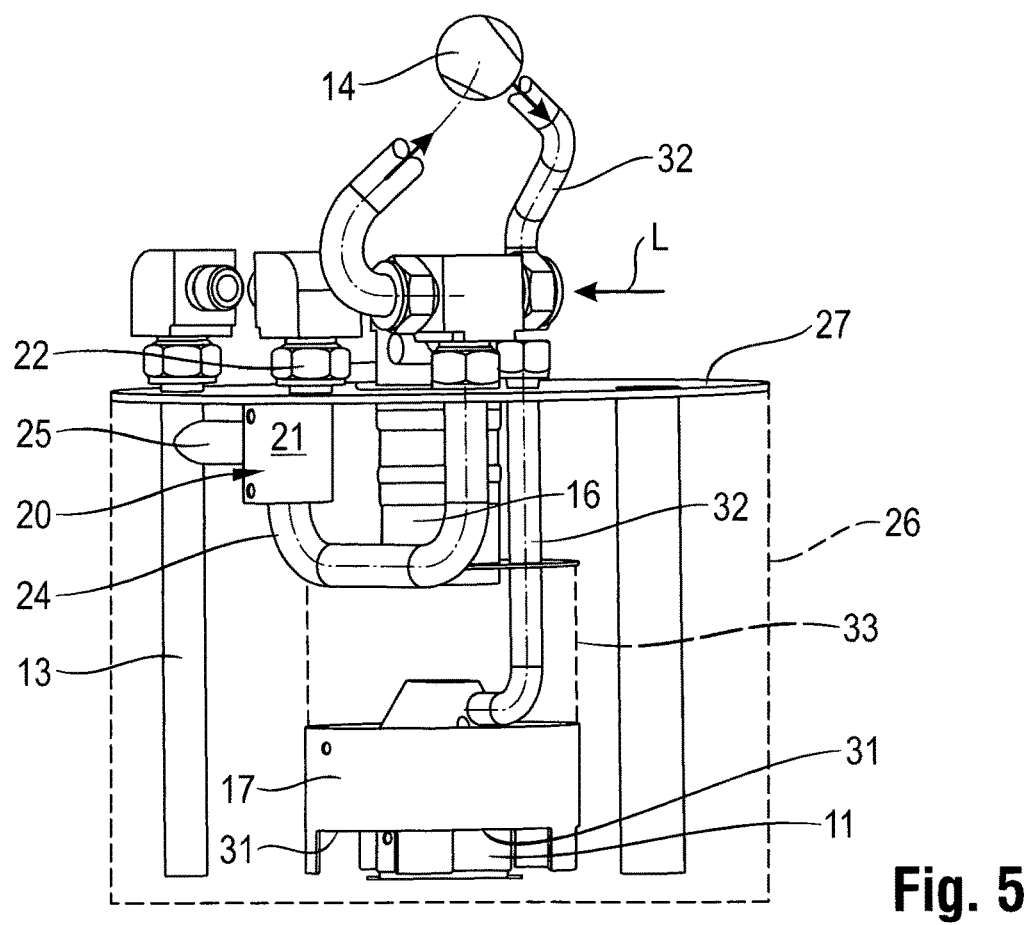

The following will draw on partly schematic drawings in describing the invention in greater detail. Shown are:

FIG. 1 a schematic general overview of the inventive energy generating unit including the installed location of the vaporizing unit, FIG. 2 a sectional view of the inventive vaporizing unit in the exhaust gas chamber of an energy generating unit, FIG. 3 a three-dimensional depiction of the energy generating unit according to FIG. 2, FIG. 4 a sectional view of a variant embodiment of the inventive vaporizing unit, and FIG. 5 a partly schematic, three-dimensional general overview of the installed location of the vaporizing unit according to FIG. 3.

FIG. 1 shows the energy generating unit according to the invention in a schematic general overview. The energy generating unit comprises a high-temperature fuel cell stack 10 (e.g. SOFC) having an anode side A and a cathode side K, wherein a reformer 11 serving in the producing of the liquid fuel, for example diesel, is provided upstream on the anode side via a recirculation line 13. The fuel F is supplied to a vaporizing unit 20 by a fuel pump 12 and introduced, respectively injected, into the anode exhaust gas from the recirculation line 13, as well as supplied to the reformer 11 together with the necessary oxidizing agent, e.g. air L by the compressor 14.

During the start cycle of the energy generating unit, a fuel pump 15 can furthermore supply the fuel F to a starter burner 16, its exhaust gas being routed to an oxidation catalyst, or afterburner 17 respectively, heating the catalyzer of the reformer 11.

The compressor 18 serves in the supplying of the oxidizing agent (e.g. air L) to the cathode side K of the fuel cell stack 10, whereby the oxidizing agent is routed by way of a heat exchanger 19 which is supplied with waste heat from the exhaust gases of the oxidation catalyst 17. The compressor 18 also supplies the necessary air L to the starter burner 16 during the start phase.

The vaporizing device 20 has a housing 21 which comprises an evaporator nonwoven 23 in the region of the fuel feed line 22 which rapidly absorbs and distributes the fuel over a large surface area. The hot anode exhaust gas from the recirculation line 13 acts upon the evaporator nonwoven 23 so that the fuel vaporizes.

As depicted for example in FIGS. 2 and 3, the housing 21 of the vaporizing unit 20 is for example cylindrical, wherein a covering side comprises a central feed line 22 for the fuel with the evaporator nonwoven 23 directly adjacent, as well as the opposite covering side comprising a central gas outlet 24 for the educt gas, consisting of anode exhaust gas and vaporized fuel. The tangentially inflowing gas inlet 25 for the anode exhaust gas ensures a vortex flow inside the vaporizer housing.

The evaporator nonwoven 23 consists of a flat, preferentially disk-spaced metal or ceramic nonwoven which also withstands high temperatures in the range of from 250° C. to 600° C. during the operation of the energy generating unit, wherein the higher temperatures are primarily reached during the energy generating unit's startup.

In FIG. 2, the housing 21 of the vaporizing unit 20 is arranged in an exhaust gas chamber 26 of the energy generating unit, said exhaust gas chamber 26 collecting hot exhaust gas of the fuel cell stack (not shown in the figure) and the starter burner 16 and feeding heat exchanger 19 via outlet 29 (see FIG. 1). The compact design and the supply of the thermal energy necessary to operate the vaporizer unit is noted here as being advantageous. The plane of separation between the apparatus's hot interior and the cold external area is indicated by a dotted line, wherein the housing 21 of the vaporizing unit 20 can for example be configured as a cylindrical sheet metal construction fixed to the wall 27 of the exhaust gas chamber, e.g. welded to same. The housing 21 can also be of conical or truncated conical configuration or exhibit another flow-optimizing form in order to increase the evaporation rate of the unit 20. The surface area of the housing 21 in the region of the evaporator nonwoven 23 can be formed by the wall 27 of the exhaust gas chamber 26.

The cross-sectional three-dimensional representation provided in FIG. 3 shows the vaporizing unit 20 in dismantled state, wherein a support ring 30 for supporting the evaporator nonwoven 23 can be recognized.

The embodiment variant according to FIG. 4 shows a vaporizing unit 20 in which an auxiliary heater is disposed. The vaporizing unit 20 thereby exhibits a heating element allocated to the evaporator nonwoven 23, preferably an electrically heated glow plug 28. It is also possible to dispose an electric heating pad or heating coil above and/or underneath the evaporator nonwoven 23. Such a vaporizing unit can also be disposed external of the exhaust gas chamber 26 and be quickly brought to operating temperature.

The partly schematic general overview of FIG. 5 shows the preferential arrangement of the vaporizing unit 20 in the exhaust gas chamber 26 into which the hot exhaust gases exiting the oxidation catalyst 17 through openings 31 enter and heat the housing 21 of the vaporizing unit 20. The oxidation catalyst 17 serves as afterburner for the starter burner 16 likewise disposed in the exhaust gas chamber 26 and the exhaust gases of the fuel cell stack.

The upper surface area of the housing 21 is formed by the wall 27 of the exhaust gas chamber 26, whereby the fuel feed line to the vaporizing unit 20 can be advantageously arranged in the cooler external area (external of the exhaust gas chamber 26).

The fuel/gas mixture (educt gas) produced in the vaporizing unit 20 is guided out of the exhaust gas chamber 26 via gas outlet line 24 and, after air L being added, fed to the compressor 14 arranged in the cooler external area. After being compressed, the educt gas enters the reformer 11 via a feeder line 32 which re-enters into the hot exhaust gas chamber 26.

A dotted line indicates the combustion chamber 33 of the starter burner 16 leading into the oxidation catalyst 17 downstream of the starter burner 16.

The invention claimed is:

1. An energy generating unit comprising:
   a high-temperature fuel cell stack operated by liquid fuel,
   a reformer connected upstream of the fuel cell stack for processing the fuel,
   a recirculation line for at least partially recirculating anode exhaust gas into the reformer,
   said recirculation line comprising a gas outlet line and a feeder line,
   a compressor for supplying anode exhaust gas to the reformer via the feeder line, and
   a feeder capable of providing liquid fuel into the anode exhaust gas, wherein the feeder vaporizes at least some fuel and includes an evaporator made of a nonwoven material that is adjacent a fuel feed line and the feeder has a housing arranged in an exhaust gas chamber of the energy generating unit, said exhaust gas chamber being capable of receiving hot exhaust gas of the energy generating unit, and wherein the gas outlet line is capable of guiding the anode exhaust gas out of the exhaust gas chamber to the compressor, wherein the feeder housing comprises a gas inlet for the anode exhaust gas leading substantially tangentially to a curved surface of the feeder housing thereinto and the feeder housing is distinct from and differently shaped or sized than the exhaust gas chamber.

2. The energy generating unit according to claim 1, wherein the housing of the feeder is cylindrical and comprises a central feed line capable of receiving the fuel on one end of the housing and a central gas outlet for gas consisting of anode exhaust gas and vaporized fuel on an opposite end of the housing.

3. The energy generating unit according to claim 1, wherein the evaporator is flat and disk-shaped and includes one of a metal or ceramic member.

4. The energy generating unit according to claim 3, wherein the feeder housing is cylindrical and comprised of thin-walled sheet metal components, wherein an end of the feeder housing proximate the evaporator is formed by a portion of a wall of the exhaust gas chamber.

5. The energy generating unit according to claim 1, wherein the housing comprises a heating element dedicated to the evaporator and includes an electrically heated heating element.

6. The energy generating unit according to claim 1, wherein the feeder housing is distinct from the reformer.

7. The energy generating unit according to claim 1, wherein the feeder housing is cylindrical with a curved surface and a covering side on one end, and wherein the evaporator is flat and positioned on an end of the feeder housing opposite the covering side.

8. The energy generating unit according to claim 1, wherein the feeder housing and the exhaust gas chamber at most share one wall.

9. A vaporizing unit for producing an educt gas from a hot carrier gas and a liquid fuel for operating a high-temperature fuel cell stack having an upstream reformer, the vaporizing unit comprising a cylindrical housing having a central feed line for the liquid fuel and an evaporator made of a nonwoven material on one end and a central gas outlet capable of receiving the educt gas on an opposite end, and the cylindrical housing being provided with a gas inlet arranged between the one end and the opposite end and being capable of receiving a hot carrier gas and leading the hot carrier gas substantially tangentially to a curved surface of the cylindrical housing thereinto, wherein the vaporizing unit is a separate and distinct unit from the upstream reformer.

10. The vaporizing unit according to claim 9, wherein at least sections of the evaporator are comprised of a metal or ceramic.

11. The vaporizing unit according to claim 9, wherein the vaporizing unit comprises a heating element, the evaporator and an electrically heated heating element.

* * * * *